US009980463B2

(12) United States Patent
Milner et al.

(10) Patent No.: US 9,980,463 B2

(45) Date of Patent: May 29, 2018

(54) DEVICE FOR AND METHOD OF DISPENSING VARIABLE SHAPED ITEMS

(71) Applicant: Petzila, Inc., San Jose, CA (US)

(72) Inventors: Simon Milner, San Jose, CA (US); Todd Lorey, Aptos, CA (US); David Clark, San Jose, CA (US)

(73) Assignee: Petzila Inc., San Jose, CA (US)

( * ) Notice: Subject to any disclaimer, the term of this patent is extended or adjusted under 35 U.S.C. 154(b) by 228 days.

(21) Appl. No.: 15/050,468

(22) Filed: Feb. 23, 2016

(65) Prior Publication Data

US 2016/0257481 A1 Sep. 8, 2016

Related U.S. Application Data

(60) Provisional application No. 62/121,446, filed on Feb. 26, 2015.

(51) Int. Cl.

*A01K 5/01* (2006.01)
*A01K 5/02* (2006.01)
*A01K 29/00* (2006.01)

(52) U.S. Cl.

CPC .......... *A01K 5/0225* (2013.01); *A01K 29/005* (2013.01)

(58) Field of Classification Search

CPC ............................ A01K 5/0225; A01K 29/005
USPC .......................................................... 221/203
See application file for complete search history.

(56) References Cited

U.S. PATENT DOCUMENTS 5,127,543 A * 7/1992 Meisels ................. A24F 15/005 221/15
6,487,987 B1 * 12/2002 Choi .................... A01K 5/0291 119/51.11
7,520,247 B2 * 4/2009 Rutledge .............. A01K 5/0114 119/51.01
8,336,492 B1 * 12/2012 Barley ...................... A01K 5/00 119/51.04
8,347,817 B1 * 1/2013 Miller .................. A01K 5/0291 119/54
8,925,485 B2 * 1/2015 Pu ........................ A01K 5/0114 119/51.02
9,633,981 B2 * 4/2017 Chylak ............... H01L 25/0657
2002/0096120 A1 * 7/2002 Busha .................. A01K 5/0291 119/51.5
2004/0194714 A1 * 10/2004 Lee ...................... A01K 5/0114 119/54
2011/0042404 A1 * 2/2011 Koike ..................... G07F 9/026 221/2

* cited by examiner

*Primary Examiner* — Patrick H Mackey
(74) *Attorney, Agent, or Firm* — Olsen Patent Law; David Olsen

(57) ABSTRACT

An item dispensing device having a wheel with a dispensing bucket formed into the wheel wall. The device can have a number of features to prevent items being dispensed from interlocking and thereby preventing further dispensing. These features can include protrusions on the cylinder wall, and a torsion spring to agitate the items to be dispensed, and a reed sweeper to help prevent jamming of an item during dispensing. Further, the device includes an ejection arm having an ejection face configured to dispense items in a manner that are engaging for a pet.

19 Claims, 3 Drawing Sheets

DEVICE FOR AND METHOD OF DISPENSING VARIABLE SHAPED ITEMS

RELATED APPLICATIONS

This patent application is a continuation of, and claims priority of, U.S. application Ser. No. 14/280,577 filed 17 May 2014 titled "APPLICATION FOR SYSTEM AND DEVICE FOR DISPENSING PET REWARDS", which is hereby incorporated herein by reference, which claims priority of U.S. Provisional Application 61/840,377 filed on 27 Jun. 2013, titled "System and Device for Monitoring Pet Communication", which is hereby incorporated herein by reference. This application also claims priority to U.S. Provisional Application 62/121,446 filed on 26 Feb. 2015, titled "PROVISIONAL PATENT APPLICATION FOR DISPENSING DEVICE FOR VARIABLE SHAPED TREATS", which is hereby incorporated herein by reference.

FIELD OF THE INVENTION

The invention relates to devices for and methods of dispensing one or more items from a hopper where the items have variable shapes and sizes. Further, the invention relates to the dispensing the one or more items to a pet in a manner that is engaging, entertaining, and playful for a pet and a pet owner. This device can include the transmission of pictures or video to the pet owner who can be entertained by a pet's interaction with receiving a dispensed item. The dispensed items can include edible pet treats. However, the inventive concept is applicable for other applications outside the area of pet treat dispensing.

BACKGROUND OF THE INVENTION

The ability of a device to reliably dispense a limited number of variable shaped and sized items from a hopper or storage device has a number of challenges. The first challenge is that items in the hopper can become interlocked and stop feeding into or dropping into a dispensing mechanism. This is true for both a top feeding hopper and a side feeding hopper. A means is needed to assure interlocked items are freed and kept flowing to the dispensing device. The means for dislodging items interlocked together needs to be gentle enough not to cause item breakage. Further, the means for agitating the treats should not create crumbs from items subject to abrasion. Secondly, depending on the size and shape of the items to be dispensed, these items can jam the dispensing mechanism and either stop further device operation or worse, causing device breakage.

What is needed are mechanisms that prevent or intervenes with the interlocking of items within the hopper and thus prevents item flow to the dispensing mechanism. Additionally, what is needed is a mechanism that prevents and/or clears jammed items within the dispensing mechanism. Also, what is needed is a dispensing mechanism that delivers pet treats in a manner that can be fun and engaging for the pet and pet owner.

SUMMARY OF THE INVENTION

In one aspect of the invention, a dispensing device includes a dispensing wheel configured to prevent the items being dispensed from being locked together. The dispensing wheel has a cylinder wall, a wheel top, a wheel bottom, a wheel width, a wheel axis, and a motor that can rotate the wheel forward or backward. One direction of rotation is a dispensing direction. The cylinder wall is configured with an indentation thereby forming a dispensing bucket. The cylinder wall can be tapered inwards towards the wheel's rotational axis.

In one embodiment, a length of the cylinder wall on a portion of the wheel width is configured with uneven protrusions. In another embodiment, the side of the length of the cylinder wall opposing the side with the protrusions is substantially smooth.

In a further embodiment, the dispenser device include one or more torsion springs. Each torsion spring has an arm, a first and a second torsion spring end. On the first end, the torsion spring is attached to the cylinder wheel wall and the second torsion spring end is free and extending from the wheel and configured to move into the hopper. These torsion springs can be orientated substantially orthogonal to the cylinder wall surface. Alternatively, the one or more torsion springs can be curved away from the dispensing direction of rotation.

In one embodiment, the dispenser device includes a reed sweeper having a first end, a second end, a length, and a width, where the first end is fixed, and wherein the second end is mounted in proximity to the wheel wall where the wheel in rotating downward during the dispensing direction of rotation.

The dispenser device can include a motor assembly having a first torque coupled to the dispenser wheel and a controller board coupled to the motor assembly. The controller board can be configured to rotate the dispenser wheel when a treat indication is wirelessly received over the Internet from a remote device. The controller board can include an overcurrent detector. The overcurrent detector provides an indication when the wheel is jammed. When an overcurrent indication is received, the controller board is configured to reverse the stepper motor for a portion of a revolution up to 180 degrees.

In a further embodiment, the dispensing device of claim 1 further comprises a circular ramp, an ejection arm having an ejection face, an ejection platform and a spring. The circular ramp is coupled to the wheel and configured to engage the ejector as the dispenser wheel rotate. The ejector is moved from a resting position to an ejection position by the circular ramp as the wheel rotates. The spring provides an return force when the ejector arm is in the ejection position. The ejector arm is configured to disengage the ramp after the dispensing bucket is in an item dispensing position. The ejection platform and ejection face are configured to cause the ejection face impart an ejection force to an item dispensed by the bucket onto the ejection platform.

In another aspect of the invention, a system for distributing items comprises an item dispensing device configured to wirelessly connect with the Internet. The dispensing device is configured to wirelessly receive a dispensing indication through the Internet. The dispensing device includes a dispenser wheel having a cylinder wheel wall, a wheel top, a wheel bottom, a wheel width, a wheel axis, and a dispensing direction of rotation wherein the cylinder wall is configured with an indentation thereby forming a dispensing bucket. The cylinder wheel walls can be tapered inwards towards the wheel axis.

In another embodiment, the system is configured with the dispensing device including a circular ramp, an ejector arm having an ejection face, an ejection platform, and spring. The circular ramp is coupled to the wheel to configured to engage the ejector arm as the wheel rotates. The ejector arm is moved from a resting position to an ejection position by the ramp as the wheel rotates. The spring provides a return force when the ejector arm is in the ejection position. The ejector arm is configured to disengage the ramp after the dispensing bucket has rotated to a dispensing position. The ejection platform and the ejection face are configured to cause the ejection face impart an ejection force to an item dispensed by the bucket onto the ejection platform.

In another aspect of the inventions, a method for distributing items from a dispensing device comprising the steps of wirelessly receiving a connection over the Internet, enabling a video camera and sending a stream of compressed digital video data to the connection, waiting to receive an dispensing indication from the Internet, checking for a motor overcurrent indication from a motor rotating a cylinder shaped dispensing wheel having a dispensing bucket containing one or more items in a dispensing direction, reversing motor direction for partial wheel rotation if motor overcurrent indication is detected, and then reversing the motor direction to an item dispensing direction, and ejecting the one or more items from the ejection platform when the wheel has reached an item dispensing position.

In another embodiment, the method uses a dispenser wheel having a cylinder wheel wall, a wheel top, a wheel bottom, a wheel width, a wheel axis, and a direction of rotation, wherein the cylinder wall is configured with an indentation thereby forming a dispensing bucket, and wherein the cylinder wheel walls are tapered inwards towards the wheel axis.

In another embodiment, the method includes a dispensing device with a circular ramp coupled to the distribution wheel, an ejector arm coupled to a spring and having an ejection face, an ejection platform, and an ejector face. The circular ramp is coupled to the wheel to configured to engage the ejector arm as the wheel rotates. The ejector arm is moved from a resting position to an ejection position by the ramp as the wheel rotates. The spring provides an return force when the ejector arm is in the ejection position. The ejector arm is configured to disengage the ramp after the dispensing bucket is in an item dispensing position. The item dispensing position is the position where the item fall out of the bucket 110 and on to the ejection platform 340. The ejection platform 340 and ejection face 310 is configured to cause the ejection face 310 to impart an ejection force to an item 20 dispensed by the bucket 110 onto the ejection platform 340 when the ejection arm 300 contact point 330 falls of the end of the ramp 110 and the spring 350 pull the arm back to an ejection position.

DETAILED DESCRIPTION OF THE INVENTION

The following description is provided as an enabling teaching of several embodiments of the invention disclosed. Those skilled in the relevant art will recognize that many changes can be made to the embodiments described, while still attaining the beneficial results of the present inventions. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

Dispenser Wheel

Figure 1:
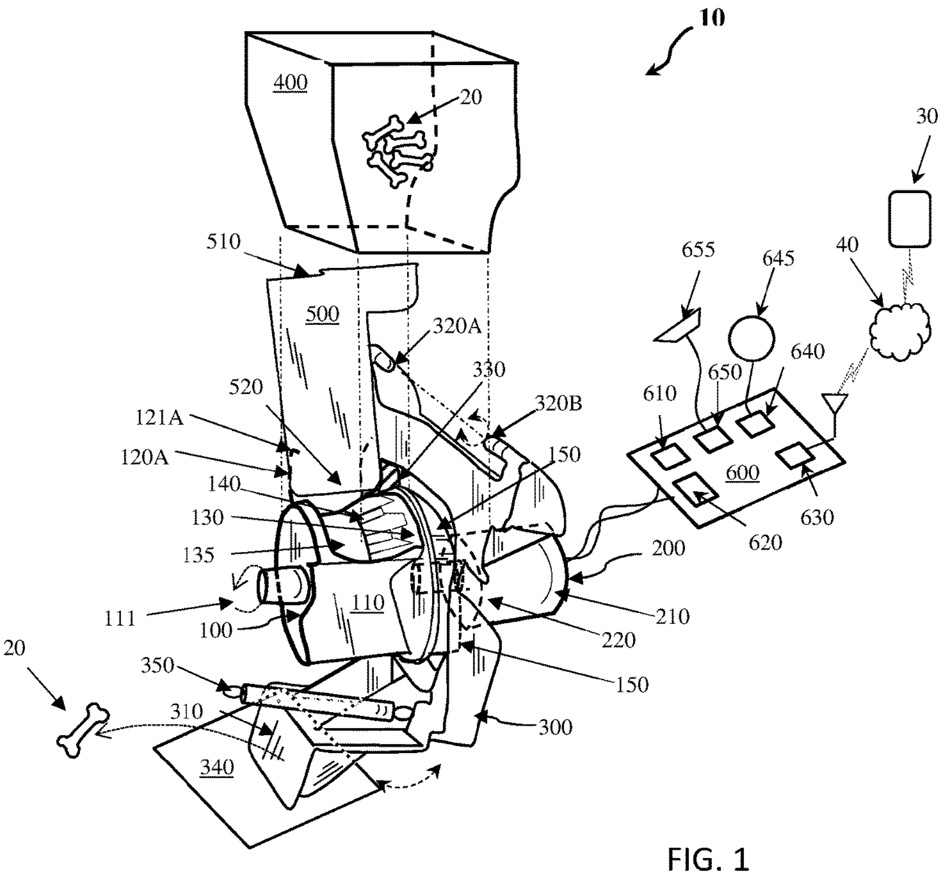
FIG. 1 is a prospective view of the dispensing wheel, motor assembly, hopper, controller board, ejection arm, and the reed sweeper in accordance with some embodiments of the present invention.
Figure 2:
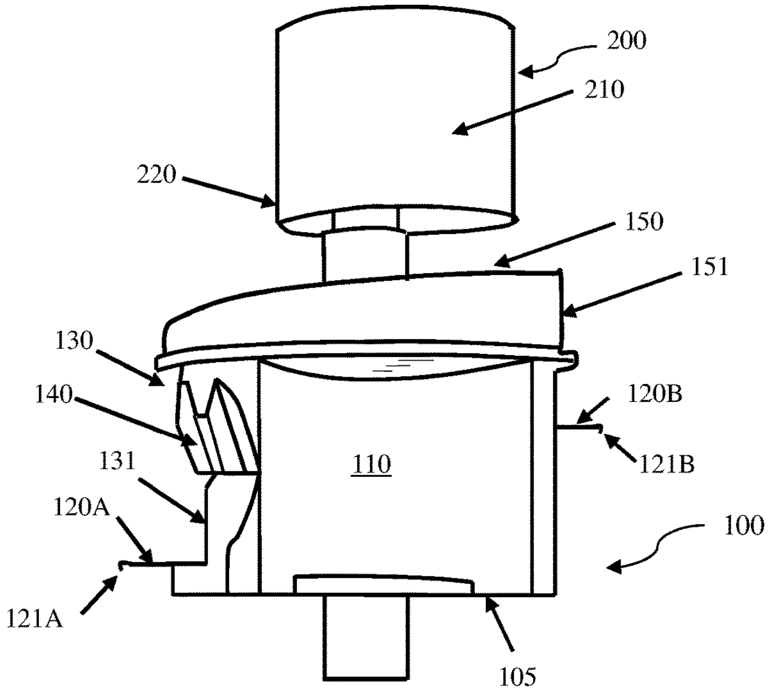
FIG. 2 is a top view of the motor assemble and the dispenser wheel.

Referring to FIGS. 1 and 2, the dispenser wheel 100 is a rotating cylinder configured with several mechanisms for dispensing variable shaped items or treats 20 while also enabling the free flow of treats or other items 20 (hereinafter, items includes treats) from a hopper 400. The dispensing wheel 100 consists of cylinder with an indentation 110 (herein after bucket) formed within the wall of the cylinder 130. The indentation can be open or close on the sides and thereby intruding into the cylinder top and or bottom. Where one or more sides of the bucket 110 are open, a structure (not shown) parallel to the wheel end 105 of the open side of the cylinder prevents the items 20 from falling out. The size of the bucket 110 can vary to accommodate the dispensing of variable sized and shaped items 20.

Referring to FIG. 2, illustrates one embodiment of the dispenser wheel 100 and the motor assembly 200. The disperser wheel 100 has several unique attributes of its cylinder wall 130 and the cylinder ends for the dispensing of treats. These features are described below.

Cylinder Wall Shape

The dispensing wheel 100 cylinder wall 130, 135 can be indented in a U-shape, V-shape or other concave shape. These shapes help feed the items to the bucket 110. The shaped cylinder wall 130, 135, 140 can help orientate items along their long dimension which help prevent jamming.

The cylinder wall 130 includes a recess that that forms a bucket 110 that hold the item(s) 20 to be dispensed. The size of the bucket 110 can vary depending on the size and number of items 20 to be dispensed. The bucket 110 preferably occupies less than fifty percent of the circumference of the dispenser wheel 100. Preferably, the bucket 110 occupies between twenty five and thirty-five percent of the circumference of the wheel 100 and has a depth of between fifty to ninety percent of the wheel 100 radius.

Cylinder Wall Variations

The cylinder wall 130 can include variations 140 to agitate the items 20 during wheel rotation. These variations 140 prevent the items 20 from interlocking the stopping further item 20 dispensing. The variations can circumscribe the cylinder wall from one bucket 110 edge to the other bucket 110 edge. Preferably, the variations 140 extend only from one side of the cylinder wall 130 to the middle of the cylinder wall 130. The other half of the cylinder wall 135 can be smooth.

In one embodiment the variations 140 are shaped like gear teeth but other variations are contemplated including but not limited to spherical bumps, a spiral groove, paddles, vanes, or a combination thereof. Preferably the surface variations 140 do not include sharp edges which could scratch or cause fragile items 20 to crumble. In another embodiment, the cylinder wall variation 140 and the smooth sections 135 alternate sides. For the section of the cylinder wall 130 not forming the bucket 110, there are preferably two side to side alterations but not more than six.

Torsion Spring

The dispenser wheel 100 can include one or more torsion springs 120A, 120B. The torsion springs 120A, 120B extends substantially perpendicular from the surface of the cylinder wall 130. However, the torsion springs 120A, 120B can be inclined up to thirty degrees away from the dispensing direction of rotation 111 or curved away from the dispensing direction of rotation 111. The torsion springs 120A, 120B can be centered on the dispensing wheel cylinder wall 130 or off-centered.

The length of the torsion springs 120A, 120B can vary. Preferably, they are long enough to extend into the hopper 400 and perturb the items 20 and thereby release any items 20 interlocked together but not so long as to require excessive torque to turn the wheel 100 as the torsion springs 120A, 120B pass under the reed sweeper 500. Lengths between the 50% to 150% of the dispenser wheel 100 radius are preferable. Additional, it is preferable if the torsion spring tips 121A, 121B are bent substantially in the direction opposite to the dispensing direction of rotation 111 of the dispensing wheel 100.

Wheel Cam

As shown in FIG. 1 and FIG. 2, the dispenser wheel 100 can include a Cam 150. The Cam 150 is positioned on one end of the dispenser wheel 100 and is configured to engage with an ejector arm 300. The Cam 150 is formed as a spiral ramp. At the end of the ramp forming the Cam 150, there is a sharp drop-off 151 that is substantially perpendicular to the end of the top of the dispenser wheel 100. The Cam 150 is orientated so that the drop-off 151 is positioned to disengage the dispenser arm 300 when the bucket 110 is in a downward orientation where the treat 20 has fallen onto the treat launch platform 340.

The length of the Cam 150 can vary. However, the Cam 150 needs to have move the ejector arm 300 back far enough so that the treat 20 fall onto the ejection platform 340 in front of ejection arm face 310.

The Cam 150 can be attached to the dispenser wheel 100 by means including but not limited to glue, a pressure fit, screws, rivets, or a combination thereof. Preferably, the Cam 150 is integrally formed with the dispenser wheel 100.

Reed Sweeper

Items 20 that stand up within the bucket 110 can jam between the bucket edge and the hopper 400 wall or other structures as the dispenser wheel 100 rotates the bucket 110 from communication with the hopper 400 to an item 20 dispensing position where the item is dropped onto the ejection table 340. Having flexibility, the reed sweeper 400 helps prevent jams.

A reed sweeper 500 is fixed at one end 510 to the device 10 structure. The opposing end 520 is free to flex and is positioned adjacent to the dispenser wheel 100. Preferably, the reed sweeper 500 will push excess items 20 back out of the bucket 110. Or if the item 20 is in an orientation that could jam the wheel 100, the reed sweeper 400 can reorientate the item 20 to be less likely to jam the wheel 100. However, if the item 20 is stuck in the bucket 110, instead of the wheel becoming jammed, the reed sweeper can flex and thereby can provide for the item(s) 20 to be dispensed. While this allows extra items 20 to be dispensed, it is better that a jammed or damaged unit 10.

Ejection Arm

The ejection arm 300 is used to launch a treat 20 from the ejection platform 340. The ejection arm 300 swings from two pivot arms 320A, 320B that engage the chassis (not shown). However, other means for the pivot arm 300 to move from a cocked position to an eject position are contemplated including but not limited to a flexing coupling between the pivot arm 300 and the chassis, or fewer or more pivot point arms.

In FIG. 1, the ejection arm 300 is shown in an ejection position. In the ejection arm moves from the cocked position to the eject position when the Cam 150 rotates past where the Cam ends 151—FIG. 2 and the point 330 of the Cam 150 is no longer engaging with the ejection arm 330.

A spring 350 provides a return force. As the dispenser wheel 100 rotates and the Cam 150 moves the ejection arm 300 to the cocked position, the spring 350 is stretched. However, other means to provide a return force are contemplated. A spring could be compressed as the dispenser wheel 100 rotates, air compression could be used, the flexing of a structure, are exemplar of other means to provide an ejection force.

Position Sensor

The system 10 can include a sensor for determining the position of the dispenser wheel 100. The position detector is useful to accurately determining when the dispensing wheel 100 has made a complete revolution. Further, the position of the dispenser wheel 100 is needed to be known in case of a jam. In the shown embodiment, the dispenser wheel 100 cannot be reversed when if the Cam 150 is going to run into the ejection arm 300.

In one embodiment, the position sensor is an optical device that receives a light from either a reflection or an LED that is broken or enabled by the ejector arm 300 when the ejector arm 300 transitions from the cocked position to the ejection position. This corresponds with the ejection arm 300 falling off the end of the Cam 150 which is a known position.

Motor Assembly, Torque Converter, and Controller

Using a simple motor to rotate the dispenser wheel 100 has a number of problems. First, if there is a jam, the motor can burn out or mechanical parts can be broken. Further, given that it is easy to jam a dispensing device with irregular shaped items, a simple rotating motor will not clear jams.

Referring to FIG. 2, the motor assembly 200 for rotating the dispenser wheel 100 includes a stepper motor 210, a reduction gear 220 for increasing the torque of the motor 200 from five to fifteen times the stepper motor's 210 torque. A high torque is required to handle the torsion springs 120A, 120B movement through the items 20 in the hopper 400 and the torsion spring flexing past the reed sweeper 500 and other structures. Commercially available stepper motors do not have sufficient torque to turn the dispenser wheel 100 under the above conditions and environment, and thus the need for the reduction gear 220.

The controller 600 can include an overcurrent detector 610 that detects over current in the motor 210. Overcurrent occurs with the dispenser wheel 100 is jammed. This condition is use by the controller board's microcontroller 620 to stop the motor 210 and perform a jam elimination sequence.

The microcontroller 620 can be configured for a treat dispensing process that include an unjamming the dispensing wheel 100. In one embodiment, when the microcontroller 620 detects an overcurrent, the dispensing wheel 100 is backed up thirty to one hundred eighty degrees and the dispensing direction 111 of rotation of the wheel is tried again. In another embodiment, the wheel 100 is backed up thirty to one hundred eighty degrees and moved forward and backwards between thirty to one hundred degrees to free any jams. One skilled in the art of programming microcontrollers would know how to program microcontroller to process an overcurrent indication, execute an item 20 dispensing procedure, and executed a jam release sequence.

Video and Audio Hardware

The unit 10 can include a video camera 645 and video hardware 640. When the video camera 645 is enabled, the digital video data is generated by the unit video hardware 640. This data is streamed through the wireless networking hardware 630, though the Internet 40, and to the remote device 30 for display.

Further, the unit 10 can include audio hardware 650 and a speaker 655 to generate and play sound. The sounds can include pre-stored sound within the audio hardware 650 or within the microcontroller 620 firmware. The sound signifies that an Internet connection has been made by a remote device 30. Further, the audio hardware 650 and speaker 655 can play audio received over the Internet 40, through the wireless networking hardware 630. This audio can include sounds, music, and speech from the remote device, or a network connected server.

Network Hardware

The controller board 600 can include network hardware 630. Preferably, the network hardware 630 is compatible with the wireless standards IEEE 802.11 WiFi and IEEE 802.15 for Bluetooth. The microcontroller 630 uses the network hardware to receive connections from remote devices 30, receive treat dispensing commands, to receive audio data to be played by the audio hardware 650, and to send video data from the video hardware 640 to the remote device 30.

Method of Dispensing Treats

Figure 3:
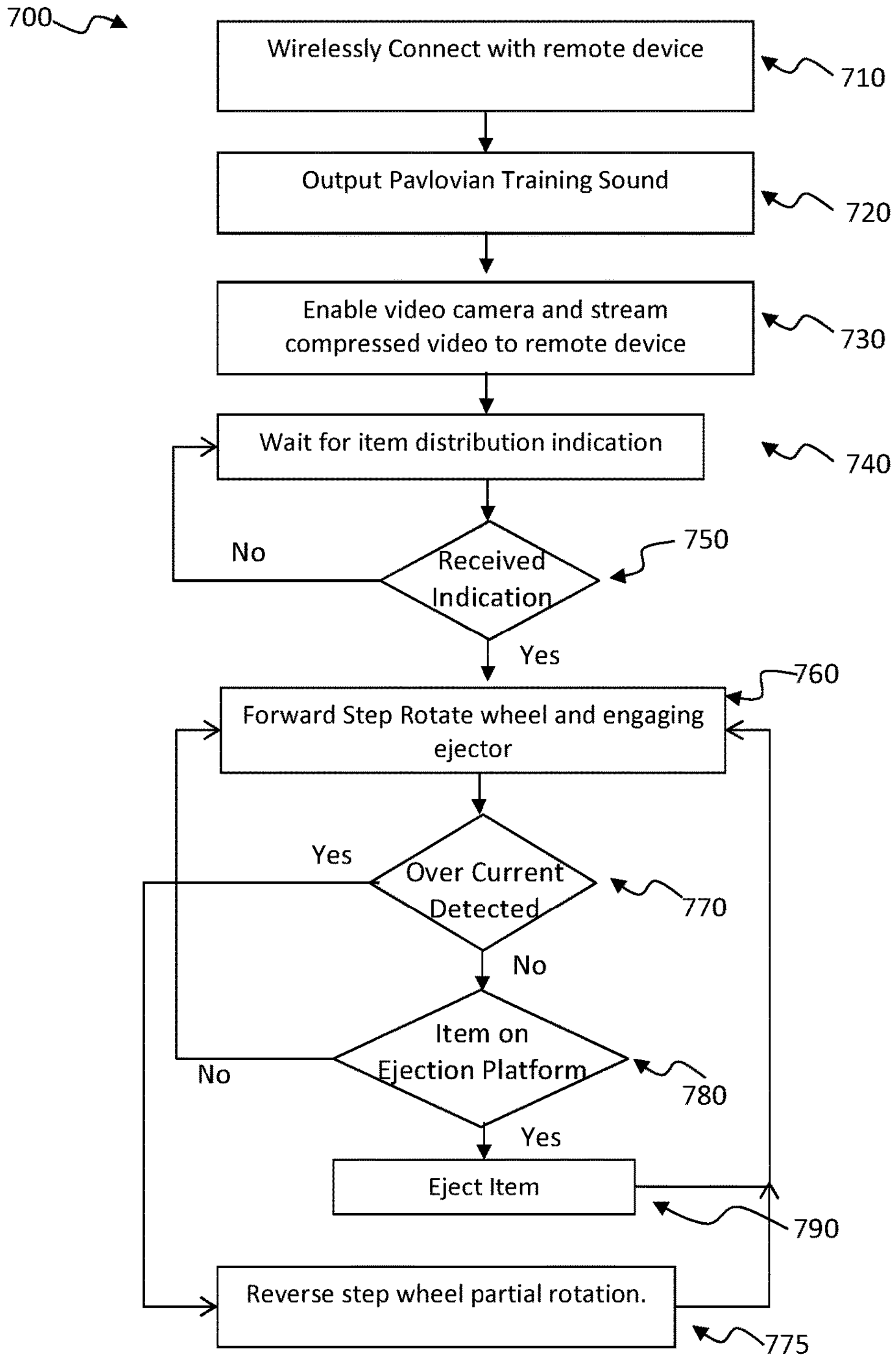
FIG. 3 is a process diagram of a method of dispensing items.

Referring to FIG. 3, a method 700 of dispensing items 20, including treats, is disclosed. While an order for performing the steps might be disclose, one skilled in the art would appreciate that some of the steps can be done in a different order.

In a step 710, a dispensing unit 10 makes a wireless connection to a remote device 30. The connection is initiated by the remote device 30. This connection can be made wirelessly over the Internet 40 using standard Internet and wireless protocols. The remote device 30 can be a mobile device including a smart phone, a tablet, a personal computer or laptop.

In a step 720, a sound is generated by the unit 10. The sound provides an alert to a pet that they may receive a treat. The sound also signifies that a connection has been made by a remote device 30 to the device 10. Preferably the sound is less than three seconds and is loud enough for a pet to be heard by a pet up to thirty feet away. Preferably, the sound loudness is controllable. The sound can be generated by the audio hardware 650 codex on the controller board 600 and output to the speaker 655. The sound can be pre-stored within the audio hardware 650 or with the microcontroller 610 firmware, or downloaded over the Internet 40.

In a step 730, a video camera 645 on the unit 10 is enabled and a stream of encoded video data is generated by the unit's video hardware 640. This data is streamed through the wireless hardware 630, though the Internet 40, and to the remote device 30 for display.

In a step 740, the unit 10 waits for message to dispense a treat from the remote device 30. The message can originate from a remote device 30 on which an application is configured for connecting with the dispensing unit 10, dispensing items 20 including treats, and viewing the digitally encoded video stream.

In a step 750, the stepper motor 200 turns the dispensing wheel 100 in steps in the dispensing direction 111. The dispensing direction is towards the reed sweeper 500. At the same time, the ejection arm 300 is moved towards an ejection position. As shown if FIG. 1, the movement of the ejection arm 300 is by a mechanical means. The spiral ramp 150 on the wheel 100 pushes the ejection arm 300 toward the ejection position. However, other means of moving the ejection arm 300 are contemplated. The ejection arm 300 can be moved by means including but not limited another motor, gears coupled to the motor 200, air pressure or a combination thereof.

In a step 760, a check for an overcurrent indication is made. The check can be an interrupt to the microcontroller 620 or by the microcontroller 620 polling a hardware status bit.

If no overcurrent condition is detected, then in a step 780, a check is made if the item 20 has been dropped by the wheel 100 onto the dispensing platform 340. This check can be determined by counting the number of forward steps the motor 210 has made from a known position, by using a sensor that detects the position of the wheel 100, timing of the motor 210 rotation of the wheel 100 or a combination thereof.

If an overcurrent indication is detected, then in a step 775, the stepper motor 210 is reversed and stepped backwards for thirty to one hundred eighty degrees. After backing the wheel 100 up, the process for dispensing a treat is resumed. The process goes back to step 760 for treat dispensing.

Operational Example

The treat dispensing unit 10 is loaded with a number of treats 20. The treats are put into a hopper 400 which is located above or adjacent to the dispenser wheel 100 such that gravity will feed the treats 20 from the hopper 400 to the dispenser wheel 100. To use the device 10, network communication is established between the unit 10 and a remote device 30. The unit 10 connects with a remote device over the Internet. The connection uses wireless hardware 630 and a network protocol such as the WiFi network protocol 802.11(a, b, g, n.)

When the network connection is established, the unit 10 can generate a sound using the controller board audio hardware 650 and speaker 655. The sound is used as a Pavlovian training to alert a pet that a treat 20 might be dispensed. Initially curiosity will get a pet to approach the unit 10 but later, an association between the sound and receiving a treat will train the pet to come to the unit 10.

Additionally, the unit 10 can include a video camera 645 and video processing electronics 640 on the controller board 600. After the remote device 30 connects through the Internet 40 and wireless hardware 630, a compressed video stream is sent from the video electronics 640 to the remote device 30 through the network hardware 630 and over the Internet 40 where the pet owner can view a pet in front of the unit 20.

Additionally, the pet owner can speak to the pet and view the pet receiving a treat 20. The controller board 600 is configured to receive from the remote device and through the Internet 40 a digital audio stream. This stream is process by the controller board 600 and audio hardware 650, and is played out the speaker 655.

The remote device 30 generates a treat dispensing indication to be sent over the Internet 40 and networking hardware 630 to the microcontroller 620. The controller board 600 steps the motor 210 to rotate the dispensing wheel 100 in a dispensing direction 111. As the wheel 100 rotates, the torsion springs 120A, 120B rotate into the hopper 400 and agitate treats 20 that might be interlocked in the hopper 400. Further, the uneven protrusions 140 on the dispensing wheel wall 130 can jostle the treats 20 and help prevent lockup of the treats 20 in the hopper 400.

As the wheel 100 rotates, the dispensing bucket 110 will rotate into communications with the hopper 400. One or more treats 20 will fall into the bucket 110 and will be carried with the bucket 110 as the wheel 100 rotates. If more than a bucket 110 full of treats 20 are carried by the wheel 100, the reed sweeper 500 can remove excessive treats 20 from the bucket 110. The reed sweeper 500 helps the unit 10 dispense a more consistent quantity of treats 20. Presumably, the uneven protrusions 140 orientate the treats 20 so that the reed sweeper 500 will remove extra or miss-aligned treats 20.

If a reed sweeper 500 fails to eliminate extra treats 20, or if a treat 20 is in an improper orientation, the treat can 20 jam between the wheel 100 and parts of the treat dispenser body (not shown). The jammed treat 20 can prevent the motor 210 from turning the wheel 100. This will cause an overcurrent within the motor 210. The controller board 600 is configured with an overcurrent detector 610 that detects an overcurrent condition when the wheel is jammed.

A microcontroller 620 receives an indication from the overcurrent detector 610. The microcontroller 620 is configured to stop the rotation of the wheel 100. The microcontroller 620 then steps the wheel backward (opposite to the treat dispensing direction) in an attempt to unjam the wheel. The backward rotation can vary from thirty degrees to one hundred eighty degrees.

As the wheel 100 rotates, a spiral ramp 150 on one side of the wheel 100 presses against an ejection arm 300 at a contact point 330. The ejection arm 300 is configured to rotate on two pivots 320A, 320B towards a ejection position in response to a force imparted by the spiral ramp 150 and against the opposing force of an ejection spring 350 as the wheel 100 rotates.

The movement of the ejection arm 300 towards an ejection position will stretch an ejection spring 350 that is coupled to the ejection arm 300 and another fixed structural component (not shown). This structural component could be the chassis or frame of the device (not shown). As the wheel 100 rotates and the end of the ramp 150 is reached, the wheel 100 rotates past the point where the ramp engages the ejector arm 300. The ramp 150 no longer provides a force against the ejection arm 300. The ejection spring 320, which has been stretch by the ramp 150 and forcing the ejector arm 300 back to the ejection position, imparts a motion to the ejection arm 300 as it returns to a rest position. The positional relationship between the ramp 150 and the bucket 110 is such that the bucket 110 will have dropped one or more treats 20 onto the ejection platform 340 before and in front of the ejection face 310 that is coupled to the ejection arm 300. When the ramp 150 reaches the maximum extension of the ejection arm 300, further wheel 100 rotation releases the arm 300 and the ejection face 310 will strike and eject the treat 20 with a force provided by the spring 350.

Especially of note, is that the dispensing process can be engaging and fun for a pet receiving the treat 20. A pet may chase the treat 20. Where the treat dispensing device 10 includes a Pavlov training tone, the device 10 becomes a game of catch and chase where the treat 20 is launched across a room. Further, if the treat dispenser has a video camera, it provides a pet owner entertainment watching his pets chase the treat.

What is claimed:

1. An item dispensing device comprising:

a wheel having a cylinder wall, a wheel top, a wheel bottom, a wheel width, a wheel axis, and a dispensing direction of rotation wherein the cylinder wall is configured with an indentation therein forming a dispensing bucket, wherein the cylinder wheel walls are tapered inwards towards the wheel axis, and wherein a length of the cylinder wall is configured with uneven protrusions.

2. The device of claim 1 wherein the uneven protrusions are along a portion of the wheel width of the wheel circumference.

3. The device of claim 2, wherein the wheel width without protrusions is substantially smooth.

4. The device of claim 1 further comprising one or more torsion springs, wherein each torsion spring has an arm, a first torsion spring end, and a second torsion spring end, wherein the first torsion spring end is attached to the wheel and the second torsion spring end is free and extending from the cylinder wall.

5. The device of claim 4, wherein the one or more of the torsion spring arms extend substantially orthogonal to the cylinder wall surface.

6. The device of claim 4, wherein the second torsion spring end of the one or more torsion springs are curved away from the dispensing direction of rotation.

7. The device of claim 1, further comprising a reed sweeper having a first reed end, a second reed end, wherein the wheel axis is substantially horizontal, wherein the first reed end is fixed, and wherein the second reed end is located in proximity to the wheel wall.

8. The device of claim 1 further comprising a motor assembly having a motor having first torque coupled to the cylinder shaped wheel and a controller board coupled to the motor, wherein the controller board in configured to rotate the wheel in a dispensing direction when a treat indication is received.

9. The device of claim 8, wherein the controller board includes an overcurrent detector configured to generate an overcurrent indication when the wheel is jammed.

10. The device of claim 9, wherein the controller board is configured to turn the motor in a direction to cause the wheel to turn in the in a direction opposite of the dispensing direction for a portion of a revolution when the overcurrent indication is detected.

11. The device of claim 10, wherein the portion of a revolution is less than one-half a wheel rotation.

12. The device of claim 11, wherein the motor assembly further comprises a motor reduction gears wherein the gears increase the first torque by a factor of five to fifteen.

13. The device of claim 8 wherein the motor is a stepper motor.

14. The device of claim 1, further comprising a circular ramp, an ejection arm that includes an ejection face, an ejection platform, and a spring, wherein the circular ramp is coupled to the wheel and to configured to engage the ejector arm as the wheel rotates, wherein the ejector arm is moved from a resting position to an ejection position by the ramp as the wheel rotates, wherein the spring provides an return force when the ejector arm is in an ejection position, wherein the ejector arm is configured to disengage the ramp after the dispensing bucket is in a dispensing position, wherein the ejection platform and ejection face is configured to cause the ejection face to impart an ejection force to an item dispensed by the bucket onto the ejection platform.

15. A system for distributing items comprising:

an item dispensing device configured to wirelessly connect with a remote device through a network, wherein the dispensing device is configured to wirelessly receive a dispense indication through the Internet, wherein the dispensing device includes a wheel having a cylinder wheel wall, a wheel top, a wheel bottom, a wheel width, a wheel axis, wherein the cylinder wall is configured with an indentation thereby forming a dispensing bucket, and wherein the cylinder wheel walls are tapered inwards towards the wheel axis.

16. The system of claim 15, wherein the dispensing device further comprising a circular ramp, an ejector arm having an ejection face, an ejection platform, and spring, wherein the circular ramp is couple d to the wheel to configured to engage the ejector as the wheel rotates, wherein the ejector is moved from a resting position to an ejection position by the ramp as the wheel rotates, wherein the spring provides an return force when the ejector arm is in the ejection position, wherein the ejector arm is configured to disengage the ramp after the dispensing bucket is in a substantially downward position, wherein the ejection platform and ejection face is configured to cause the ejection face impart an ejection velocity to an item dispensed by the bucket onto the ejection platform.

17. A method for distributing items from a dispensing device comprising the steps:

wirelessly receiving a connection from a remote device over a network;

enabling a video camera and sending a stream of compressed digital video data to the connection;

waiting to receive an dispensing indication from the remote device;

checking for a motor overcurrent indication from a motor rotating a dispenser wheel having a dispensing bucket containing one or more items in an item dispensing direction;

reversing motor direction for partial wheel rotation if motor overcurrent indication is detected and then reversing the motor direction to an item dispensing direction; and ejecting the one or more items from the ejection platform an when wheel has reached an item delivery position.

18. The method of claim 17, wherein the dispenser wheel has a cylinder wheel wall, a wheel top, a wheel bottom, a wheel width, a wheel axis, and a direction of rotation, wherein the cylinder wall is configured with an indentation thereby forming a dispensing bucket, and wherein the cylinder wheel walls are tapered inwards towards the wheel axis.

19. The method of claim 18, wherein the dispensing device further comprising a circular ramp coupled to the, an ejector arm having an ejection face, an ejection platform, and spring, wherein the circular ramp is coupled to the wheel to configured to engage the ejector as the wheel rotates, wherein the ejector is moved from a resting position to an ejection position by the ramp as the wheel rotates, wherein the spring provides an return force when the ejector arm is in the ejection position, wherein the ejector arm is configured to disengage the ramp after the dispensing bucket is in a dispensing position, wherein the ejection platform and ejection face is configured to cause the ejection face impart an ejection force to an item dispensed by the bucket onto the ejection platform.

* * * * *